(12) United States Patent
Kozak (10) Patent No.: US 9,038,054 B1
(45) Date of Patent: May 19, 2015

(54) SYSTEM AND METHOD FOR AUTOMATED PRODUCT VERSION ROLLBACK

(71) Applicant: GOOGLE INC., Mountain View, CA (US)

(72) Inventor: Michael Marian Kozak, Mountain View, CA (US)

(73) Assignee: GOOGLE Inc., Mountain View, CA (US)

( * ) Notice: Subject to any disclaimer, the term of this patent is extended or adjusted under 35 U.S.C. 154(b) by 0 days.

(21) Appl. No.: 13/906,003

(22) Filed: May 30, 2013

Related U.S. Application Data (60) Provisional application No. 61/654,430, filed on Jun. 1, 2012.

(51) Int. Cl.
*G06F 9/44* (2006.01)

(52) U.S. Cl.
CPC .................................. *G06F 8/71* (2013.01)

(58) Field of Classification Search
CPC .............................................. G06F 8/60–8/78
USPC ................................ 717/120–123, 168–178
See application file for complete search history.

(56) References Cited

U.S. PATENT DOCUMENTS

| | | | | |
|---|---|---|---|---|
| 5,732,275 | A * | 3/1998 | Kullick et al. .................. | 717/170 |
| 8,220,054 | B1 * | 7/2012 | Lu ....................................... | 726/24 |
| 2003/0172368 | A1 * | 9/2003 | Alumbaugh et al. ........... | 717/106 |
| 2006/0130045 | A1 * | 6/2006 | Wesley et al. ................... | 717/168 |
| 2008/0120598 | A1 * | 5/2008 | Imeshev .......................... | 717/120 |
| 2009/0113412 | A1 * | 4/2009 | Shribman et al. .............. | 717/170 |
| 2009/0138855 | A1 * | 5/2009 | Huene et al. .................... | 717/125 |
| 2010/0042981 | A1 * | 2/2010 | Dreyer et al. ................... | 717/146 |
| 2012/0079471 | A1 * | 3/2012 | Vidal et al. ...................... | 717/169 |

OTHER PUBLICATIONS

Billington, Corey, Hau L. Lee, and Christopher S. Tang. "Successful strategies for product rollovers." Sloan Management Review, Spering (1998), pp. 23-30.*
Model, CMMi Capability Maturity, and SW-CMMi Capability Maturity Model. "Software Maintenance." IEEE (2003), pp. 6-1 to 6-20.*
Gupta, Deepak, Pankaj Jalote, and Gautam Barua. "A formal framework for on-line software version change." Software Engineering, IEEE Transactions on 22.2 (1996), pp. 120-131.*

(Continued)

*Primary Examiner* — Satish Rampuria
(74) *Attorney, Agent, or Firm* — Birch, Stewart, Kolasch & Birch, LLP (57) ABSTRACT

A method, computer program product, and computer system for a sentiment action process. Electronic feedback reports about a version of a product are received over a network from one or more users of a plurality of users. Sentiment of at least a portion of the electronic feedback reports about the version of the product is analyzed. The sentiment of at least the portion of the electronic feedback reports about the version of the product is determined to have reached a threshold. In response to determining that the sentiment of at least the portion of the electronic feedback reports about the version of the product has reached the threshold, the version of the product is automatically changed to a second version of the product.

12 Claims, 3 Drawing Sheets

(56) References Cited

OTHER PUBLICATIONS

Hicks, Michael, and Scott Nettles. "Dynamic software updating." ACM Transactions on Programming Languages and Systems (TOPLAS) 27.6 (2005), pp. 1049-1096.*

Lyu, Janghoon, et al. "A procedure-based dynamic software update." Dependable Systems and Networks, 2001. DSN 2001. International Conference on. IEEE, pp. 271-280, 2001.*

* cited by examiner

SYSTEM AND METHOD FOR AUTOMATED PRODUCT VERSION ROLLBACK

PRIORITY CLAIM

The present Application claims benefit of priority under 35 U.S.C. §119(e) to U.S. Provisional Application No. 61/654,430, filed in the USPTO on Jun. 1, 2012—the entire contents of which are hereby incorporated by reference.

TECHNICAL FIELD

This disclosure relates to user feedback analysis systems and methods and, more particularly, to automated product version rollback systems and methods.

BACKGROUND

Products may be provided for user consumption. For example, email products and social website products (e.g., Facebook™, LinkedIn™, Twitter™) may be currently available and used by millions of users. There may be multiple versions of the product where new features (e.g., messaging, chat, user interface changes, etc.) are added, removed, and/or improved upon. However, each individual user may or may not approve of the newest product version and may send either positive or negative sentiment or "user feedback", e.g., to the product developers, to document their approval/disapproval.

After reviewing at least some of the positive and/or negative user feedback, a product developer may decide to change (e.g., rollback) the product version to another version of the product (e.g., a previous version) that did not have as much negative user feedback. This can be a lengthy process and the user(s) who provided the negative user feedback may become frustrated with the continued use of the product version and/or believe that their user feedback is being ignored by the product developer. This may result in one or more users ceasing use of the product altogether.

SUMMARY OF DISCLOSURE

In one implementation, a method for a sentiment action process, performed by one or more computing devices, comprises receiving, over a network, electronic feedback reports about a version of a product from one or more users of a plurality of users. Sentiment of at least a portion of the electronic feedback reports about the version of the product is analyzed. The sentiment of at least the portion of the electronic feedback reports about the version of the product is determined to have reached a threshold. In response to determining that the sentiment of at least the portion of the electronic feedback reports about the version of the product has reached the threshold, the version of the product is automatically changed to a second version of the product.

One or more of the following features may be included. Analyzing the sentiment of at least the portion of the electronic feedback reports about the version of the product may include aggregating at least the portion of the electronic feedback reports into at least one of a product version level and a time level. Analyzing the sentiment of at least the portion of the electronic feedback reports about the version of the product may include comparing at least the portion of the electronic feedback reports about the version of the product with at least a portion of other electronic feedback reports about the second version of the product.

One or more of the electronic feedback reports about the version of the product may include information associated with the product version. The second version of the product may be one of a previous version of the product and a next version of the product.

The threshold may include a threshold difference between the sentiment of at least the portion of the electronic feedback reports about the version of the product and sentiment of at least a portion of other electronic feedback reports about the second version of the product. The threshold may include a threshold of at least one of an amount of the electronic feedback reports received, an amount of positive sentiment compared to negative sentiment, and a time that the one or more users spend using the version of the product.

In another implementation, a computer program product resides on a computer readable medium that has a plurality of instructions stored on it. When executed by a processor, the instructions cause the processor to perform operations comprising receiving, over a network, electronic feedback reports about a version of a product from one or more users of a plurality of users. Sentiment of at least a portion of the electronic feedback reports about the version of the product is analyzed. The sentiment of at least the portion of the electronic feedback reports about the version of the product is determined to have reached a threshold. In response to determining that the sentiment of at least the portion of the electronic feedback reports about the version of the product has reached the threshold, the version of the product is automatically changed to a second version of the product.

One or more of the following features may be included. Analyzing the sentiment of at least the portion of the electronic feedback reports about the version of the product may include aggregating at least the portion of the electronic feedback reports into at least one of a product version level and a time level. Analyzing the sentiment of at least the portion of the electronic feedback reports about the version of the product may include comparing at least the portion of the electronic feedback reports about the version of the product with at least a portion of other electronic feedback reports about the second version of the product.

One or more of the electronic feedback reports about the version of the product may include information associated with the product version. The second version of the product may be one of a previous version of the product and a next version of the product.

The threshold may include a threshold difference between the sentiment of at least the portion of the electronic feedback reports about the version of the product and sentiment of at least a portion of other electronic feedback reports about the second version of the product. The threshold may include a threshold of at least one of an amount of the electronic feedback reports received, an amount of positive sentiment compared to negative sentiment, and a time that the one or more users spend using the version of the product.

In another implementation, a computing system includes a processor and memory configured to perform operations comprising receiving, over a network, electronic feedback reports about a version of a product from one or more users of a plurality of users. Sentiment of at least a portion of the electronic feedback reports about the version of the product is analyzed. The sentiment of at least the portion of the electronic feedback reports about the version of the product is determined to have reached a threshold. In response to determining that the sentiment of at least the portion of the electronic feedback reports about the version of the product has reached the threshold, the version of the product is automatically changed to a second version of the product.

One or more of the following features may be included. Analyzing the sentiment of at least the portion of the electronic feedback reports about the version of the product may include aggregating at least the portion of the electronic feedback reports into at least one of a product version level and a time level. Analyzing the sentiment of at least the portion of the electronic feedback reports about the version of the product may include comparing at least the portion of the electronic feedback reports about the version of the product with at least a portion of other electronic feedback reports about the second version of the product.

One or more of the electronic feedback reports about the version of the product may include information associated with the product version. The second version of the product may be one of a previous version of the product and a next version of the product.

The threshold may include a threshold difference between the sentiment of at least the portion of the electronic feedback reports about the version of the product and sentiment of at least a portion of other electronic feedback reports about the second version of the product. The threshold may include a threshold of at least one of an amount of the electronic feedback reports received, an amount of positive sentiment compared to negative sentiment, and a time that the one or more users spend using the version of the product.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

System Overview

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the Internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the Internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device Computer program code for carrying out operations of the present disclosure may be written in an object oriented programming language such as Java™, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an internet service provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
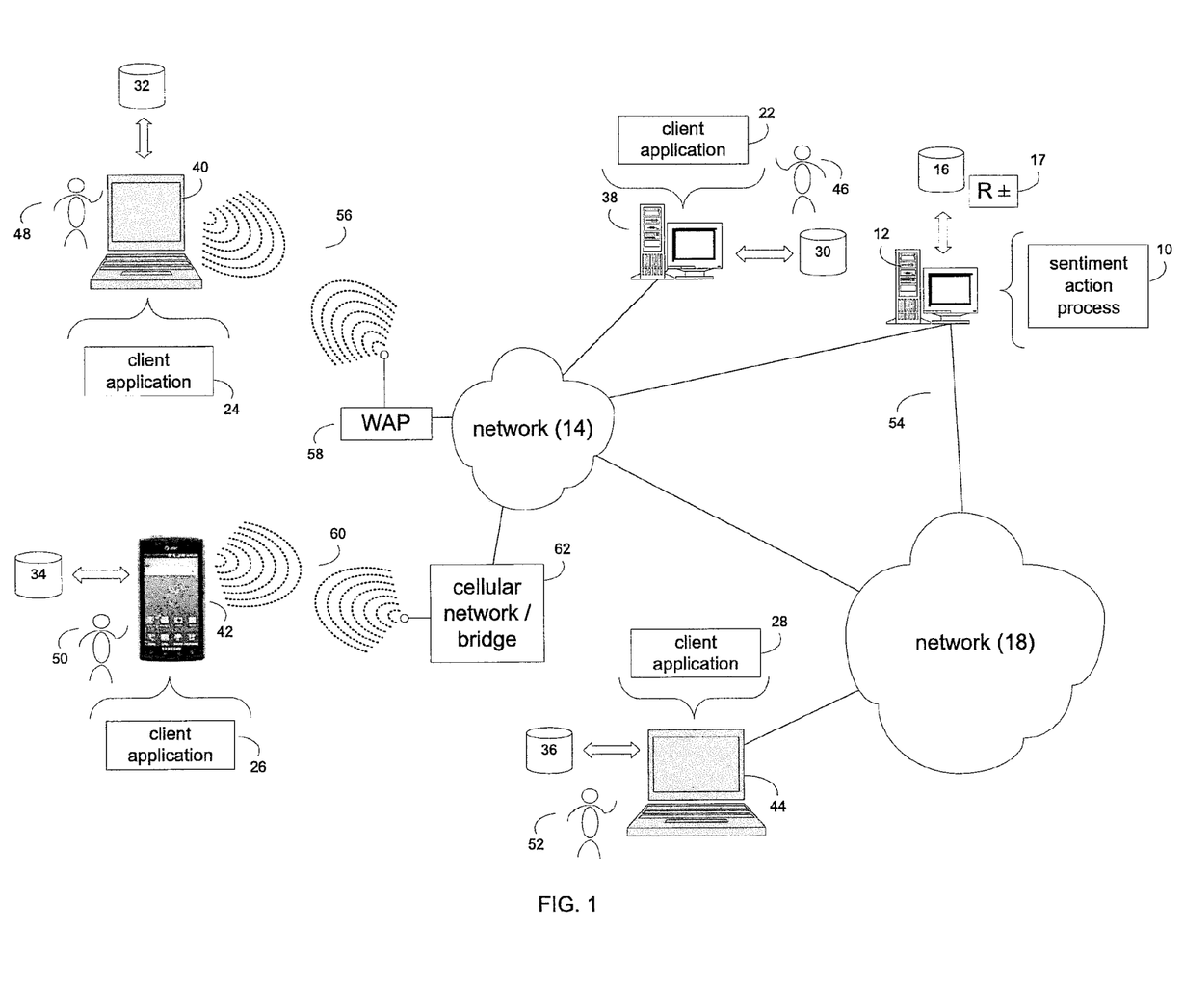
FIG. 1 is an illustrative diagrammatic view of a sentiment action process coupled to a distributed computing network.

Referring to FIG. 1, there is shown sentiment action process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a tablet computer, a mainframe computer, or a computing cloud. The various components of computer 12 may execute one or more operating systems, examples of which may include but are not limited to: Microsoft Windows Server™; Novell Netware Redhat Linux™, Unix, or a custom operating system, for example.

As will be discussed below in greater detail, sentiment action process 10 may receive, over a network (e.g., networks 14, 18), electronic feedback reports (e.g., electronic feedback report(s) 17) about a version of a product from one or more users (e.g., users 46, 48, 50, 52 via client electronic devices 38, 40, 42, 44 and/or client applications 22, 24, 26, 28) of a plurality of users. Sentiment of at least a portion of the electronic feedback reports about the version of the product may be analyzed. The sentiment of at least the portion of the electronic feedback reports about the version of the product may be determined to have reached a threshold. In response to determining that the sentiment of at least the portion of the electronic feedback reports about the version of the product has reached the threshold, the version of the product may be automatically changed to a second version of the product.

The instruction sets and subroutines of sentiment action process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database) (not shown) and may be located within any suitable memory location, such as storage device 16 coupled to computer 12. In some embodiments, computer 12 may utilize a database management system such as, but not limited to, "My Structured Query Language" (MySQL™) in order to provide multi-user access to one or more databases, such as the above noted relational database. The data store may also be a custom database, such as, for example, a flat file database or an XML database. Any other form(s) of a data storage structure may also be used. Sentiment action process 10 may be a component of the database, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Sentiment action process 10 may be accessed via client applications 22, 24, 26, 28. Examples of client applications 22, 24, 26, 28 may include but are not limited to a standard and/or mobile web browser, email client application, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), a television (not shown) with one or more processors embedded therein or coupled thereto, and a dedicated network device (not shown).

One or more of client applications 22, 24, 26, 28 may be configured to effectuate some or all of the functionality of sentiment action process 10. Accordingly, sentiment action process 10 may be a purely server-side application, a purely client-side application, or a hybrid server-side/client-side application that is cooperatively executed by one or more of client applications 22, 24, 26, 28 and sentiment action process 10.

Users 46, 48, 50, 52 may access computer 12 and sentiment action process 10 directly through network 14 or through secondary network 18. Further, computer 12 may be connected to network 14 through secondary network 18, as illustrated with phantom link line 54. Sentiment action process 10 may include one or more user interfaces, such as browsers and textual or graphical user interfaces, through which users 46, 48, 50, 52 may access sentiment action process 10.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phaseshift keying (i.e., PSK) modulation or complementary code keying (i.e., CCK) modulation, for example. As is known in the art, Bluetooth™ is a telecommunications industry specification that allows, e.g., mobile phones, computers, and smart phones to be interconnected using a short-range wireless connection.

Client electronic devices 38, 40, 42, 44 may each execute an operating system, examples of which may include but are not limited to Android™, Apple iOS™, Microsoft Windows™, Redhat Linux™, or a custom operating system.

The Sentiment Action Process:

As discussed above and referring also to FIGS. 2-3, sentiment action process 10 may receive 202, over a network (e.g., network 14, 18, 303), electronic feedback reports (e.g., electronic feedback reports 17, 317a, 317b, 317c) about a version of a product (e.g., user interface 302) from one or more users (e.g., user(s) 46, 48, 50, 52) of a plurality of users. For example, assume a product release cycle has been synchronized with sentiment action process 10 and that users 46, 48, 50 are accessing a website of server 12 that provides a particular version (e.g., version 2.1) of user interface 302 at time $T_1$ to the users. In the example, each user 46, 48, 50 may indicate, e.g., via sentiment action process 10, whether or not they approve or disapprove of a portion of the features of user interface 302 at $T_1$ or all features of user interface 302 at $T_1$. Users 46, 48, 50 may be, for example, a percentage of the plurality of users, a set number of users, or the entire plurality of users.

Figure 3:
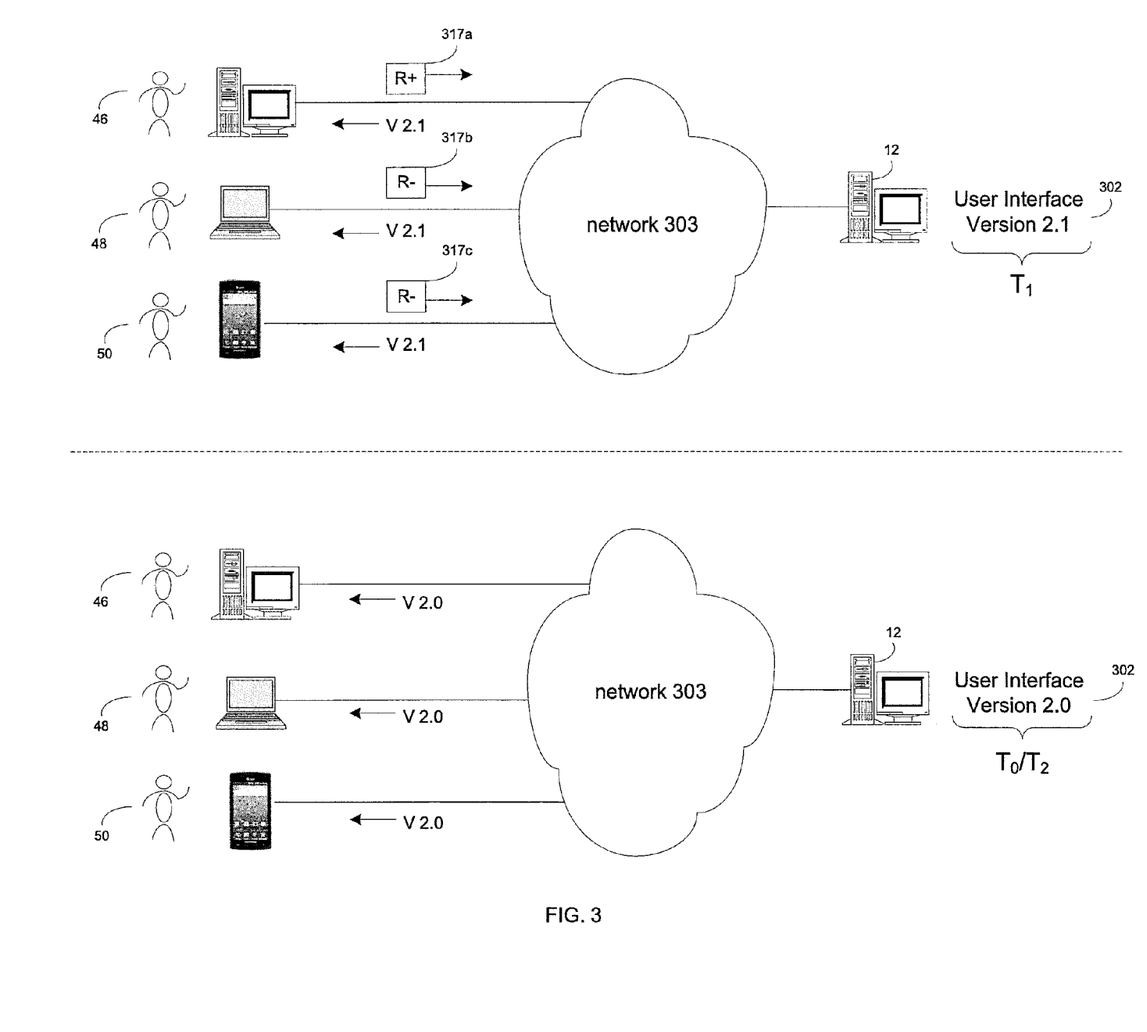
FIG. 3 is an illustrative diagrammatic view of the sentiment action process of FIG. 1.

Illustratively, $T_0$, $T_1$, and $T_2$ generally and broadly indicate discrete time periods when versions 2.0 and version 2.1 are provided (e.g., available) to one or more particular users (e.g., users 46, 48, 50) of the plurality of users. For instance, at a first time $T_0$, user 46 accessing the website of server 12 may be provided by, e.g., sentiment action process 10, with version 2.0 of user interface 302. However, at a next (e.g., later) time $T_1$, user 46 accessing the website of server 12 may be provided by sentiment action process 10 with version 2.1 of user interface 302 in place of version 2.0. Similarly, at an even later time $T_2$, user 46 accessing the website of server 12 may once again be provided by sentiment action process 10 with version 2.0 of user interface 302 in place of version 2.1. Those skilled in the art will appreciate that the above example (and timeline) of $T_0$, $T_1$, and $T_2$ is for illustrative purposes only and not intended to limit the scope of the disclosure. Further, it is contemplated that the same version of user interface 302 need not be provided simultaneously to all users (e.g., users 46, 48, 50).

In the above example, according to one or more embodiments, assume that version 2.1 is currently provided to users 46, 48, 50. One or more of the electronic feedback reports (e.g., electronic feedback reports 317a, 317b, 317c) about user interface 302 from users 46, 48, 50 may include information associated with version 2.1 of user interface 302 at $T_1$. For example, according to one or more embodiments, sentiment action process 10 may, e.g., through a web browser (not shown), provide users 46, 48, 50 with, for instance, a "send feedback" button (not shown), like/dislike button (not shown), input field to write one or more comments (not shown), scaled rating selection for one or more features of user interface 302, or combination thereof, where users 46, 48, 50 may indicate their approval/disapproval sentiment with the electronic feedback report(s). According to one or more embodiments, electronic feedback report 317a may include an indication of an approval/positive sentiment (e.g., R+) of at least a portion of user interface version 2.1 at $T_1$ from user 46, whereas electronic feedback reports 317b and 317c may include an indication of a disapproval/negative sentiment (e.g., R−) of at least a portion of user interface version 2.1 at $T_1$ from users 48 and 50. Other information may also be included with electronic feedback reports 317a, 317b, and 317c, such as the version of user interface 302 at $T_1$ associated with the respective electronic feedback report(s), and the particular feature(s) of user interface 302 at $T_1$ associated with the electronic feedback report(s) (e.g., if the electronic feedback report(s) does not refer generally to all features of version 2.1 of user interface 302 at $T_1$).

Figure 2:
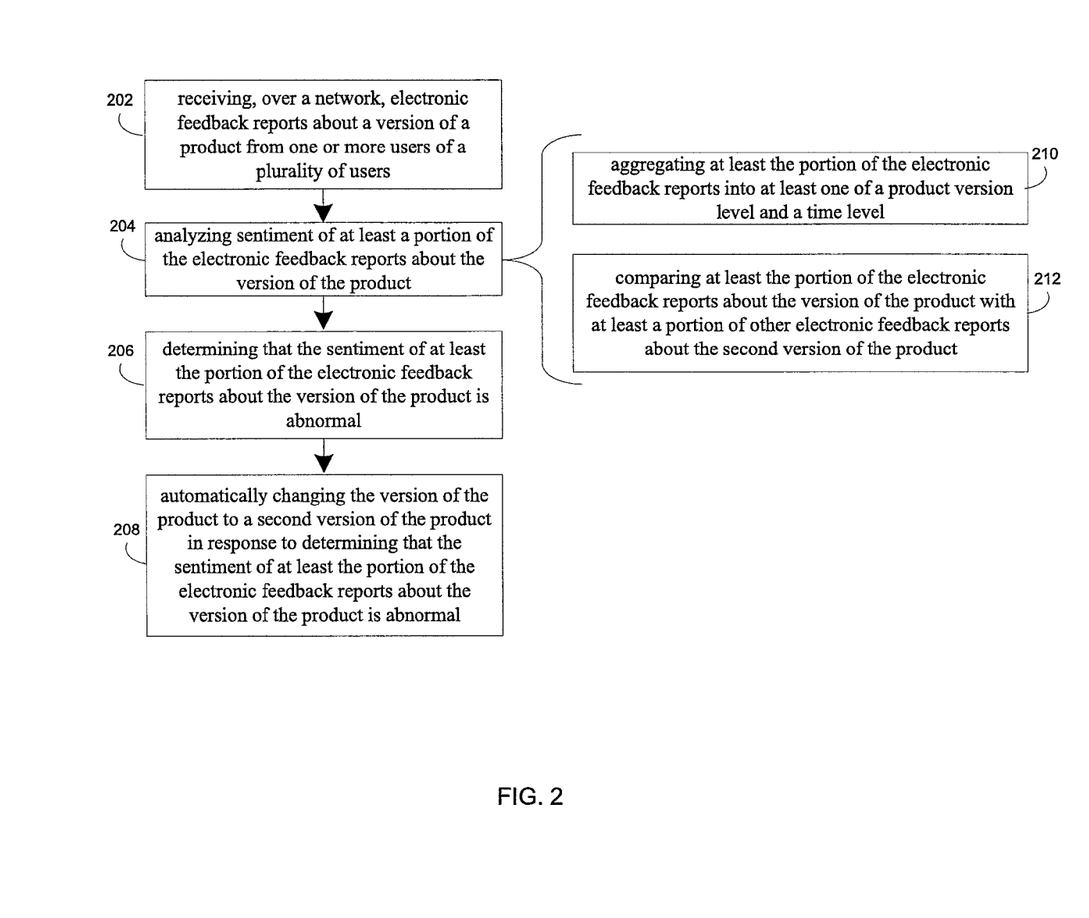
FIG. 2 is an illustrative flowchart of the sentiment action process of FIG. 1.

Continuing with the above example, sentiment action process 10 may analyze 204 the sentiment of at least a portion of electronic feedback reports 317a, 317b, 317c associated with version 2.1 of user interface 302 at $T_1$. The sentiment may include, for example, the appropriate information that may be required, e.g., for sentiment action process 10 to determine whether each respective electronic feedback report contains a positive (+) sentiment (e.g., pro/approval), negative (−) sentiment (e.g., con/disapproval), or any combination thereof. As noted in the above example, electronic feedback report 317a of user 46 contains positive sentiment about version 2.1 of user interface 302 at $T_1$, whereas electronic feedback reports 317b and 317c of users 48 and 50 respectively contain negative sentiment about version 2.1 of user interface 302 at $T_1$. Those skilled in the art will recognize that an explicit approval/disapproval is not required in the electronic feedback reports, and that approval/disapproval sentiment of the electronic feedback report(s) may be determined by sentiment action process 10 using any well known sentiment analysis techniques (e.g., machine learning, latent semantic analysis, semantic orientation, support vector machines, etc.).

Analyzing 204 the sentiment of at least the portion of electronic feedback reports 317a, 317b, 317c may include sentiment action process 10 aggregating 210 electronic feedback reports 317a, 317b, 317c at, for example, a product version level and/or a time level. For instance, electronic feedback reports 317a, 317b, 317c may each pertain to version 2.1 of user interface 302 at $T_1$, and thus may be aggregated 210 together at the same product version level (e.g., version 2.1). However, if it is assumed that electronic feedback report 317c pertains to another version of user interface 302 (e.g., version 2.0 of user interface 302 at $T_0$), then electronic feedback report 317c would not be aggregated 210 together with electronic feedback reports 317a and 317b at the same product version level.

Similarly, for example, electronic feedback reports 317a, 317b, 317c may each have been received by sentiment action process 10 during a predetermined period of time (e.g., 3 days), and thus may be aggregated 210 together at the same time level. However, if it is assumed that electronic feedback report 317c was received by sentiment action process 10 after the predetermined period of time (e.g., day 4), then electronic feedback report 317c would not be aggregated 210 together with electronic feedback reports 317a and 317b at the same time level. As another example, the time level may include an average (e.g., average sentiment) of the electronic feedback reports received in a given period of time (e.g., one day).

Those skilled in the art will recognize that other levels of aggregation may also be used without departing from the scope of the disclosure. For example, sentiment action process 10 may aggregate 210 electronic feedback reports 317a, 317b, 317c at a particular feature level (e.g., font color) of any particular version(s) of user interface 302. For instance, sentiment action process 10 may aggregate 210 electronic feedback reports 317a, 317b, 317c specifically pertaining to the font color used by version 2.1 of user interface 302 at $T_1$ at the same feature level. However, if it is assumed that electronic feedback report 317c specifically pertains to background colors used by version 2.1 of user interface 302 at $T_1$ (as compared to font color), then electronic feedback report 317c would not be aggregated 210 together with electronic feedback reports 317a and 317b at the same feature level. As such, any description of a particular aggregation level should be taken as an example only and not to otherwise limit the scope of the disclosure.

Additionally/alternatively, sentiment action process 10 analyzing 204 the sentiment of electronic feedback reports 317a, 317b, 317c may include comparing 212 at least a portion of electronic feedback reports 317a, 317b, 317c about version 2.1 of user interface 302 at $T_1$ with one or more other electronic feedback reports (not shown) about another version (e.g., version 2.0) of user interface 302 at $T_0$. For example, assume electronic feedback reports 317a, 317b, 317c each pertain to a specific feature (e.g., font color) of version 2.1 of user interface 302 at $T_1$. Assume that each of the other received electronic feedback reports (not shown) also pertain to the same feature (e.g., font color), but is associated with version 2.0 of user interface 302 at $T_0$. In the example, sentiment action process 10 may compare 212 the appropriate electronic feedback reports specifically pertaining to the font color of each version (e.g., version 2.1 of user interface 302 at $T_1$ and version 2.0 of user interface 302 at $T_0$). Notably, the same users (e.g., users 46, 48, 50) need not have provided the other electronic feedback reports (not shown), as those may be provided by different users of the plurality of users.

Those skilled in the art will recognize that other comparisons and/or combinations of comparisons thereof between electronic feedback reports 317a, 317b, 317c about version 2.1 of user interface 302 at $T_1$ and other electronic feedback reports (not shown) about version 2.0 of user interface 302 at $T_0$ may be made. For example, sentiment action process 10 may compare 212 the amount (e.g., number) of received user electronic feedback reports with respect to each version 2.0 and 2.1 of user interface 302.

As another example, electronic feedback reports may include information about the amount of time a user has spent using either version of user interface 302. As such, sentiment action process 10 may compare 212 how much time one or more users has spent using version 2.1 (or a particular feature of version 2.1) with how much time one or more users (e.g., identical or different users) has spent using version 2.0 (or the particular feature of version 2.0). Sentiment action process 10 may provide any user with the ability to opt-out of providing any such information.

As another example, electronic feedback reports may include information about online posts (e.g., comments, dialogues, etc.) that a user has read and/or created with regard to user interface 302. As such, sentiment action process 10 may compare 212 how many online posts are read and/or created by one or more users with regard to version 2.1 (or a particular feature of version 2.1) with how many posts are read and/or created by one or more users (e.g., identical or different users) with regard to version 2.0 (or the particular feature of version 2.0). As such, any particular comparison or combinations thereof by sentiment action process 10 should be taken as an example only and not to otherwise limit the scope of the disclosure. Sentiment action process 10 may provide any user with the ability to opt-out of providing any such information.

Additionally/alternatively, sentiment action process 10 may compare 212 the electronic feedback reports pertaining to the same version. For example, the number of received electronic feedback reports that approve of version 2.1 of user interface 302 at $T_1$ (and/or a particular feature thereof) may be compared 212 with the number of received electronic feedback reports that disapprove of version 2.1 of user interface 302 at $T_1$ (and/or the particular feature thereof). As such, any particular description of comparing 212 the electronic feedback reports of differing versions of user interface 302 (and/or the particular feature(s) thereof) should be taken as an example only and not to otherwise limit the scope of the disclosure.

Sentiment action process 10 may determine 206, e.g., after analyzing 204 and/or comparing 212 the sentiment of electronic feedback reports 317a, 317b, 317c, that the sentiment about version 2.1 of user interface 302 at $T_1$ has reached a threshold. For instance, according to one or more of the above examples, the threshold may include a threshold difference between the overall sentiment of electronic feedback reports 317a, 317b, 317c about version 2.1 of user interface 302 (and/or a particular feature thereof) at $T_1$ and the overall sentiment of other electronic feedback reports (not shown) about version 2.0 of user interface 302 (and/or the particular feature thereof) at $T_0$. According to one or more of the above examples, the threshold may include, for example, a threshold of the amount of electronic feedback reports received by sentiment action process 10, an amount of positive sentiment compared to negative sentiment, and a time that the users (e.g., users 46, 48, 50) have spent using version 2.1 of user interface 302 (and/or the particular feature thereof). Those skilled in the art will appreciate that any threshold may be associated with any of the above noted examples of analysis 204 and comparison 212 performed by sentiment action process 10.

In response to sentiment action process 10 determining 206 that the sentiment of electronic feedback reports 317a, 317b, 317c about version 2.1 of user interface 302 at $T_1$ has reached the threshold, sentiment action process 10 may automatically change 208 version 2.1 of user interface 302 at $T_1$ to another version (e.g., version 2.0 of user interface 302 at $T_2$). For example, assume at $T_0$ that a previous version 2.0 of user interface 302 has a red background and is provided by server 12 to one or more of users 46, 48, 50. Further assume that at $T_1$, a newer version 2.1 of user interface 302 has a blue background and is provided by server 12 to one or more of users 46, 48, 50 instead of the red background of version 2.0. According to one or more embodiments, further assume that at $T_1$, sentiment action process 10 has not determined 206 that a threshold amount (e.g., 10,000) of electronic feedback reports includes, e.g., negative feedback, pertaining to the new blue background in version 2.1. Now assume that at $T_2$, sentiment action process 10 has determined 206 that 10,000 electronic feedback reports include negative feedback pertaining to the new blue background in version 2.1. In response to sentiment action process 10 determining 206 that the threshold has been reached, sentiment action process 10 may at $T_2$ automatically change 208 (e.g., rollback) version 2.1 to the previous version 2.0 where the red background is used instead of the blue background. Thus, in the example, when one or more of users 46, 48, 50 access the website of server 12 at or after $T_2$, version 2.0 may then be provided to users 46, 48, 50 instead of version 2.1.

Those skilled in the art will appreciate that, in the same example, sentiment action process 10 may automatically change 208 version 2.1 to a later or next version (e.g., version 2.2) instead of back to the earlier version 2.0. As such, the description of automatically changing 208 to an earlier version should be taken as an example only and not to otherwise limit the scope of the disclosure.

Additionally/alternatively, according to one or more embodiments, sentiment action process 10 need not automatically change 208 version 2.1 of user interface 302 at $T_1$ to version 2.0 of user interface 302 at T₂ for each user 46, 48, 50. For example, it is contemplated that user 46 may be provided with a choice by sentiment action process 10 as to whether or not sentiment action process will change from version 2.1 to version 2.0, e.g., since user feedback report 317a of user 46 was positive. Thus, sentiment action process 10 may automatically change 208 version 2.1 to version 2.0 for users 48 and 50 (e.g., since user feedback reports 317b and 317c of users 48 and 50 were negative), but may provide the choice to user 46. According to one or more embodiments, each user 46, 48, 50 may also be provided with the same choice by sentiment action process 10 irrespective of the associated sentiment of their user feedback report.

While one or more of the embodiments has been described in terms of a particular product (e.g., user interface 302), those skilled in the art will appreciate that other products may also be used without departing from the scope of the disclosure. For example, the product may be a social network, an email service, or any other product not necessarily related to software. As such, the specific description of a user interface should be taken as an example only and not to otherwise limit the scope of the disclosure.

According to one or more embodiments, while one or more example embodiments may be described with automatically changing 208 entire versions of user interface 302, it is contemplated that changing to "another version" may include automatically changing 208 only select features of a version. For example, assume version 2.1 of user interface 302 contains multiple changes from version 2.0, and further assume that sentiment action process 10 determines 206 that the sentiment of electronic feedback reports 317a, 317b, 317c about version 2.1 has reached a threshold that is specific to a single feature of version 2.1. In the example, sentiment action process 10 may limit the automatic changing 208 of version 2.1 only to the specific feature, rather than back to version 2.0 in its entirety. As such, sentiment action process 10 automatically changing 208 one version to a second version should not preclude an interpretation where only a portion of the features are automatically changed 208.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) are possible without departing from the scope of the disclosure defined in the appended claims.

What is claimed is:

1. A computer-implemented method, comprising:
providing, over a network, a version of a product to a plurality of end users of the product;
providing, over a network, a user interface that allows the end users of a provided version of a product to indicate a degree of positive or negative sentiment about one or more features of the provided version of the product;
receiving, over a network, electronic feedback reports from one or more of the plurality of end users, the electronic feedback reports including a degree of positive or negative sentiment about one or more features of a provided version of a product;
aggregating the degree of positive or negative sentiment in the feedback reports based on the product version;
determining whether the aggregated degree of positive or negative sentiment relating to a first version of the product has reached a predetermined threshold; and
in response to determining that the aggregated degree of positive or negative sentiment has reached the predetermined threshold, automatically changing the version of the product to be provided from the first version to a second version of the product, and
providing the second version of the product to a plurality of end users.

2. The computer-implemented method of claim 1 wherein the second version of the product is one of a previous version of the product and a next version of the product.

3. The computer-implemented method of claim 1, wherein determining if the aggregated degree of positive or negative sentiment has reached a predetermined threshold includes
determining a difference between the aggregated degree of positive or negative sentiment regarding the first version of the product and the aggregated degree of positive or negative sentiment regarding the second version of the product.

4. The computer-implemented method of claim 1, wherein the threshold includes a threshold for at least one of an amount of the electronic feedback reports received, an amount of positive sentiment compared to negative sentiment, and an amount of time that the one or more users spend using the version of the product.

5. A non-transitory computer readable medium having embodied thereon instructions which, when executed by a processor, cause the processor to perform operations comprising:
   providing, over a network, a version of a product to a plurality of end users of the product;
   providing, over a network, a user interface that allows the end users of a provided version of a product to indicate a degree of positive or negative sentiment about one or more features of the provided version of the product;
   receiving, over a network, electronic feedback reports from one or more of the plurality of end users, the electronic feedback reports including a degree of positive or negative sentiment about one or more features of a provided version of a product;
   aggregating the degree of positive or negative sentiment in the feedback reports based on the product version;
   determining whether the aggregated degree of positive or negative sentiment relating to a first version of the product has reached a predetermined threshold;
   in response to determining that the aggregated degree of positive or negative sentiment has reached the predetermined threshold, automatically changing the version of the product to be provided from a first version to a second version of the product, and
   providing the second version of the product to a plurality of end users.

6. The medium of claim 5 wherein the second version of the product is one of a previous version of the product and a next version of the product.

7. The medium of claim 5 wherein determining if the aggregated degree of positive or negative sentiment has reached a predetermined threshold includes determining a difference between the aggregated degree of positive or negative sentiment regarding the first version of the product and the aggregated degree of positive or negative sentiment regarding the second version of the product.

8. The medium of claim 5 wherein the predetermined threshold includes a threshold for at least one of an amount of the electronic feedback reports received, an amount of positive sentiment compared to negative sentiment, and an amount time that the one or more users spend using the version of the product.

9. A computing system including a processor and memory configured to perform operations comprising:
   providing, over a network, a version of a product to a plurality of end users of the product;
   providing, over a network, a user interface that allows the end users of a provided version of a product to indicate a degree of positive or negative sentiment about one or more features of the provided version of the product;
   receiving, over a network, electronic feedback reports from one or more of the plurality of end users, the electronic feedback reports including a degree of positive or negative sentiment about one or more features of a provided version of a product;
   aggregating the degree of positive or negative sentiment in the feedback reports based on the product version;
   determining whether the aggregated degree of positive or negative sentiment relating to a first version of the product has reached a predetermined threshold; and
   in response to determining that the aggregated degree of positive or negative sentiment has reached the predetermined threshold, automatically changing the version of the product to be provided from the first version to a second version of the product, and
   providing the second version of the product to a plurality of end users.

10. The computing system of claim 9 wherein the second version of the product is one of a previous version of the product and a next version of the product.

11. The computing system of claim 9 wherein determining if the aggregated degree of positive or negative sentiment has reached a predetermined threshold includes determining a difference between the aggregated degree of positive or negative sentiment regarding the first version of the product and the aggregated degree of positive or negative sentiment regarding the second version of the product.

12. The computing system of claim 9 wherein the predetermined threshold includes a threshold for at least one of an amount of the electronic feedback reports received, an amount of positive sentiment compared to negative sentiment, and an amount of time that the one or more users spend using the version of the product.

* * * * *

UNITED STATES PATENT AND TRADEMARK OFFICE
CERTIFICATE OF CORRECTION

PATENT NO. : 9,038,054 B1  
APPLICATION NO. : 13/906003  
DATED : May 19, 2015  
INVENTOR(S) : Michal Marian Kozak Page 1 of 1

It is certified that error appears in the above-identified patent and that said Letters Patent is hereby corrected as shown below:

Title Page, item (72) should read  Michal Marian KOZAK

Signed and Sealed this
Twenty-fourth Day of November, 2015

Michelle K. Lee
*Director of the United States Patent and Trademark Office*